April 29, 1958 W. A PAINE 2ND 2,832,318
SERVO CONTROL UNIT
Filed April 30, 1952 6 Sheets-Sheet 1

Fig. I

INVENTOR.
William A. Paine 2ND
BY Barnes + Seed
attys

April 29, 1958 W. A. PAINE 2ND 2,832,318
SERVO CONTROL UNIT
Filed April 30, 1952 6 Sheets-Sheet 3

INVENTOR.
William A. Paine 2ND
BY Barnes & Seed
attys

April 29, 1958  W. A. PAINE 2ND  2,832,318
SERVO CONTROL UNIT
Filed April 30, 1952  6 Sheets-Sheet 5

INVENTOR.
William A. Paine 2ND
BY Barnes & Seed
attys

United States Patent Office 2,832,318
Patented Apr. 29, 1958

2,832,318

SERVO CONTROL UNIT

William A. Paine 2nd, Seattle, Wash., assignor, by mesne assignments, to Ex-Cell-O Corporation, a corporation of Michigan Application April 30, 1952, Serial No. 285,351

6 Claims. (Cl. 121—46.5)

The present invention relates to servo control systems, and more specifically to an electro-hydraulic servo control unit whereby a differential pressure output is made proportional to an electrical input signal. Typical intended applications of this unit are in high performance position servos, velocity or speed control servos, and acceleration or force regulators.

One of the principal objects of the present invention is to provide such a servo control unit which will be sensitive at all of the low as well as the high differential pressure outputs.

Another object is to provide a servo control unit which will have a particularly fast response at high differential pressure outputs.

Still another aim of the invention is to provide a very compact servo control unit of relatively simple construction which can be readily adjusted and which is substantially foolproof in operation.

With these and other still more particular objects and advantages in view, and which will appear and be understood in the course of the following description and claims, the invention consists in the novel construction and in the adaptation and combination of parts hereinafter described and claimed.

In the accompanying drawings:

Figs. 11 through 13 are schematics of three embodiments of my invention.

Figure 12:
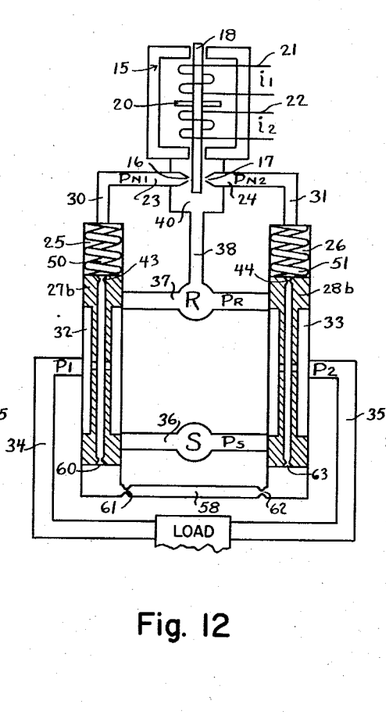
Figure 13:
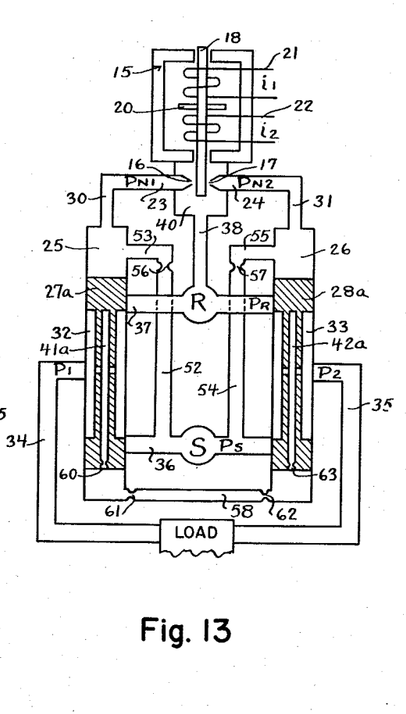

It is thought that a basic understanding of the principle of operation of my servo control unit will be expedited by first studying the schematics of the various embodiments thereof shown in Figs. 11–13. In each instance a torque motor 15 is used in conjunction with a pair of opposed nozzles 16, 17 to transpose an electrical current differential into a pressure differential. The armature 18 of the torque motor has a central elastic hinge 20 and is provided with a pair of coils 21, 22. When a differential current $(i_1-i_2)$ flows through these coils the armature becomes magnetized with a north pole at one end and a south pole at the other. As a result the attraction or repulsion of the permanent magnetic poles of the motor which are positioned at opposite sides of the armature, causes the latter to turn about its elastic hinge. The direction of movement is, of course, determined by the relative magnitudes of the currents $i_1$ and $i_2$. One end of the armature is extended between the nozzles 16, 17 so that as the armature rotates it tends to increase the resistance to the flow of fluid through one of the nozzles and decrease the resistance to the flow through the other nozzle. These nozzle flows perforce determine the nozzle back pressures, denoted $Pn_1$ and $Pn_2$, in the nozzle chambers 23, 24, and hence these pressures are proportional to the current differential $(i_1-i_2)$. The nozzle pressures are in all of the embodiments of my invention applied to the head end faces of a pair of shuttle valves 27, 28, slidably mounted in bores 25, 26 provided in a suitable housing, the communicating passages between the nozzle chambers and these bores being denoted 30 and 31.

The shuttle valves each have a reduced central section so that annular valve chambers 32, 33 are separated from the remainder of the bores. These chambers are in constant communication with a load by lines 34, 35, one to one side and the other to the other side of the load, and are of such a length that endwise shuttling action of the valves will bring the chambers into alternate connection with the mouths of supply and discharge passage 36, 37 extending between the bores. The first of these passages connects with a supply S of fluid under a high constant pressure $Ps$, and the latter dumps to a low pressure return line R whose pressure is denoted $Pr$ and is normally atmospheric. This return line also is connected by a passage 38 with a cavity 40 into which the fluid from the nozzles 16, 17 is discharged. The rates of flow to and from the valve chambers 32, 33 determines the pressures $P_1$ and $P_2$, respectively, therein, and these rates are, of course, controlled by the degree of exposure of the mouths of the supply and discharge passages.

The structure thus far described is common to all of the embodiments of my invention. Continuing now to the distinctions between these various species attention is first directed to that shown in Fig. 11 wherein it will be noted that compression springs 50, 51 are mounted in the head ends of the bores 25, 26 and act against the corresponding ends of the valves 27, 28. The latter are hollow by virtue of axially extending through-bores 41, 42 which are in direct communication with the valve chambers and serve as a flow connection between these chambers and the head and foot ends of the bores 25, 26. However, it should be noted that the head ends of the through bores are provided with orifices 43, 44 causing pressure differentials between the nozzle chambers 23, 24 and the valve chambers 32, 33. Subjacent the bores 25, 26 the housing is provided with piston chambers 43, 44 which are cross-connected by passages 45, 46 with the opposite of the bores so that the pressure in the piston chamber 43 is $P_2$ and that in the chamber 44 is $P_1$. These pressures act upon the foot end faces of pistons 47, 48 which in turn slidably extend into the bores 25, 26 and are urged against the foot ends of the shuttle valves. Neglecting for a moment the action of the pistons 47, 48, it can be seen that when the shuttle valves are in an equilibrium position for any setting of the torque motor current $(i_1-i_2)$ the valve 27 will have combined forces due to the pressure $Pn_1$ and the spring 50 acting on its head end in opposition to the force due to the pressure $P_1$ acting on the foot end of the valve. From this it is apparent that the force due to $P_1$ will always be greater than the force due to the nozzle pressure $Pn_1$ by an amount equal to the force being exerted by the spring 50. Accordingly, the pressure drop across the orifice 43 is determined solely by this spring. Therefore, since $Pn_1$ is proportional to the current $(i_1-i_2)$ as shown supra, $P_1$ will also be proportional to this torque motor current differential. In like manner $P_2$ will always be proportional to this current differential so that the pressure differential $(P_1-P_2)$ constantly bears a proportional relationship with the current differential $(i_1—i_2)$.

The shuttle valves are always free to automatically adjust themselves to maintain the pressure relationship corresponding to the torque motor current $(i_1—i_2)$. For example, if the pressure $P_1$ is too low to satisfy the balanced force condition above outlined the valve 27 will move toward the foot end of the bore 25 and allow flow from the supply passage 36 to the valve chamber 32 so as to raise $P_1$ to the required value. Likewise, if pressure $P_2$ is too high to satisfy the balance force condition for the valve 28 the latter will shuttle toward the head end of the bore 26 and thus allow flow from the valve chamber 33 to the discharge passage 37 until a balanced condition is effected.

The pistons 47, 48 are provided to offset the respective forces of the spring 50, 51 if it is desired to reduce pressure $P_1$ or $P_2$ to zero when the other pressure reaches it maximum value, and namely the pressure $Ps$. To elaborate and using pressure $P_1$ as an example, it can be readily seen that when this pressure approaches $Pr$ in response to a lowering of pressure $Pn_1$ to its minimum value, the force of the spring 50 will be virtually unopposed and will cause the shuttle valve 27 to move toward the foot end of the bore 25 causing the supply passage 36 to be exposed to the valve chamber 32. As a consequence the pressure $P_1$ can never reach $Pr$. Therefore, it is necessary to introduce a force against each of the foot ends of the valves 27, 28 which is equal to the force exerted by the springs 50, 51 when the respective valve barely covers the mouth of the supply passage 36. This is accomplished in the Fig. 11 embodiment by making the area of the pistons 27, 28 such that the product of the piston area and the pressure $Ps$ is equal or slightly greater than the said force exerted by the springs. With this arrangement, when for example, pressure $P_2$ approaches the value $Ps$ and is conducted to piston 47 via the cross-connecting passage 46, it will cause the piston to offset the force of the spring 50.

Bypassing Fig. 12 for the moment, in the embodiment of Fig. 13 the springs 50, 51 and orifices 43, 44 of the Fig. 11 construction have been eliminated and the valves plugged at their head ends, these modified valves being denoted 27a and 28a. The fluid for the nozzles 16, 17 is obtained directly from the supply S through passages 52—53 and 54—55 via orifices 56, 57 instead of from the valve chambers. It will also be noted that the pistons 47, 48 and the cross-connecting passages 45, 46 have been replaced by a single cross-connecting passage 58 and four orifices 60 to 63. The first and lattermost of these orifices are of equal size and are placed at the foot ends of the bores 41a and 42a in the valves, and the central two are located in the passage 58. With this arrangement the shuttle pressures $Pn_1$ and $Pn_2$ acting on their head ends and these are opposed by the pressures at the foot ends of the bores 25, 26, the latter being less than the pressures $P_1$ and $P_2$ by the pressure drops across the orifices 60 and 63, respectively. Accordingly, assuming a proper correlation of the sizes of the orifices, it is clear that the valves will each always automatically assume an equilibrium position in response to changes induced in the nozzle pressures by altering the current differential $(i_1—i_2)$.

Since there is a continued supply of fluid to the nozzles 16, 17 in the Fig. 13 embodiment $Pn_1$ and $Pn_2$ will always exceed $Pr$. Accordingly, if the two sides of the unit were independent of one another, as would be the case, for example, if passage 58 dumped directly into the discharge R, then $P_1$ and $P_2$ could never be lowered to $Pr$ just as would be the case discussed earlier if the Fig. 11 arrangement did not include the pistons 47, 48 and cross-connecting passages 45, 46. The cross-connection 58 between the foot end portions of the bores 25, 26 assures that there will always be a pressure in these foot end portions even if $P_1$ or $P_2$ has been lowered to $Ps$, for nevertheless there will be a flow from the bore having the higher pressure to that having the lower pressure. Accordingly, the orifice sizes are adjusted so that the pressure drop across the orifices 60 and 63 is equal to or slightly greater than the pressure drop across the respective nozzle 16, 17 when the pressure in the corresponding valve chamber is $Pr$. In this regard, the number of orifices between the orifices 60 and 63 can be one or more depending upon the sensitivity desired.

The embodiment of Fig. 12 is a combination of those of Figures 11 and 13, and namely the head end portion of the former and the foot end portion of the latter. Corresponding numerals have therefore been applied except that the modified valves have been denoted 27b and 28b, and their through-bores 41b and 42b. It is thought that the operation of the device is self-evident from the earlier discussion of the operations of the other two embodiments. However, it might be well to note that the orifices must be sized so that the pressure drop across the orifices 60 and 63 times the cross-sectional area of the valves equals the force of the springs 50 and 51 when the respective valve chamber pressure $P_1$ or $P_2$ equals $Ps$.

Summarizing briefly the operations of all of the illustrated embodiments, the shuttle valves can be thought of as amplifiers which step up nozzle pressures determined by the operator through settings of the electrical input to the torque motor. These stepped-up pressures in turn determine the forces acting on the foot ends of the valves, and when these foot-end forces are great enough to offset the forces acting on the head ends of the valves due to the nozzle pressures and springs, if any, the valves will automatically reach an equilibrium condition whereat there is obtained the desired amplified pressures, and hence the desired pressure differential.

Figure 1:
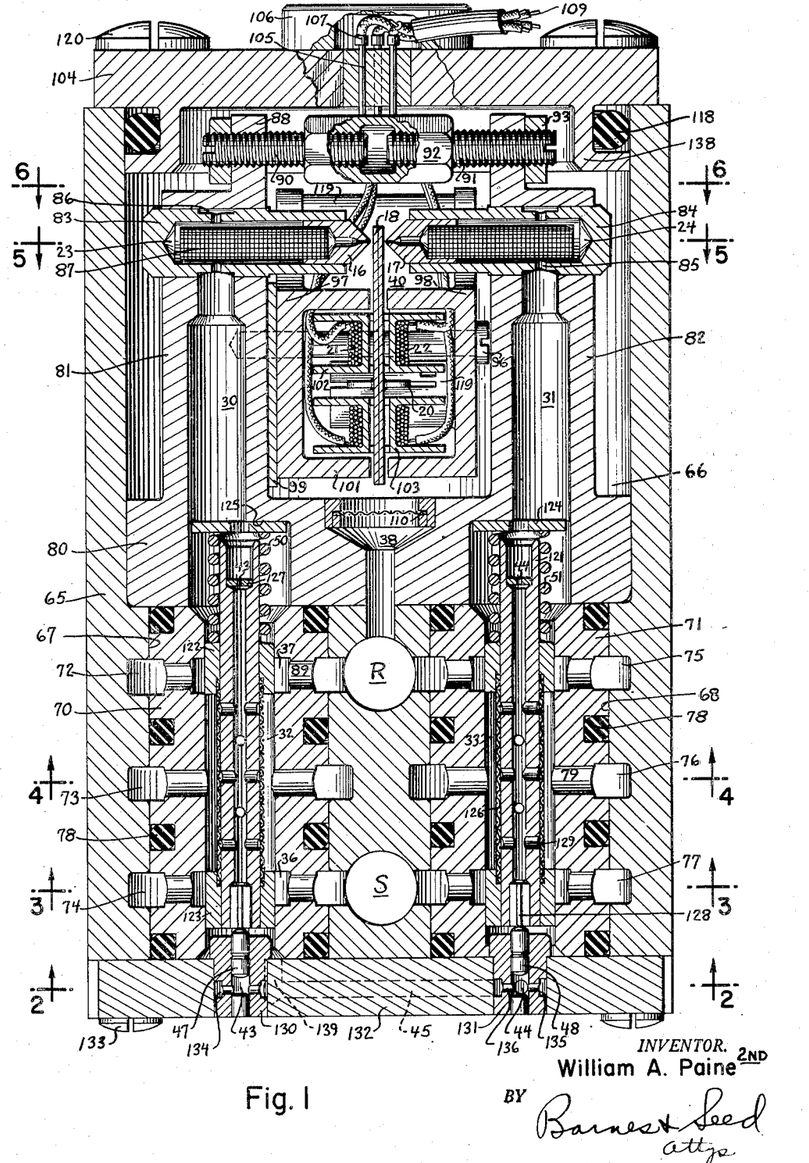
Figure 1 is a horizontal sectional view of my servo control unit taken through the longitudinal axis of the unit.
Figure 2:
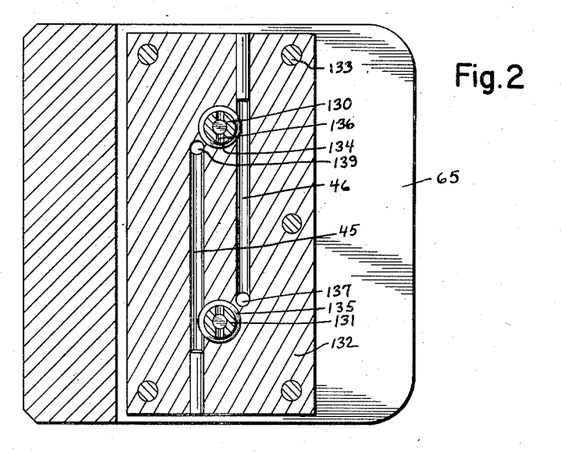
Figs. 2 to 6, inclusive, are vertical sectional views taken along lines 2—2 through 6—6, respectively, of Fig. 1 at a reduced scale.
Figure 2:
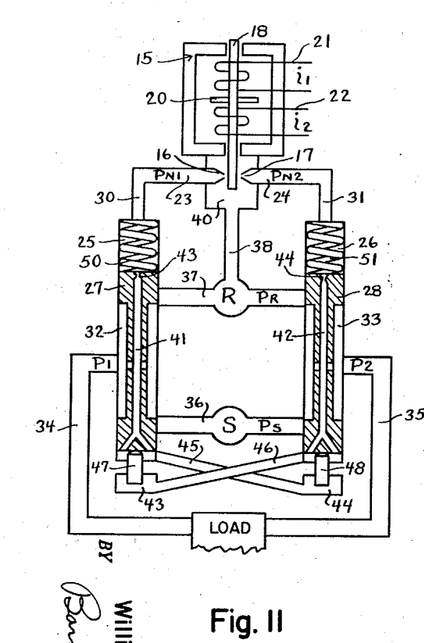
Figure 3:
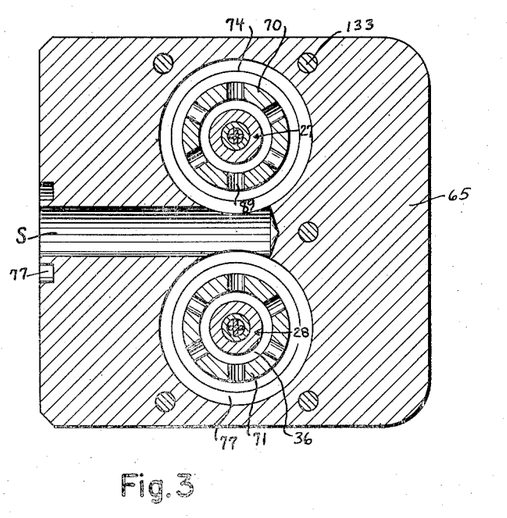
Figure 4:
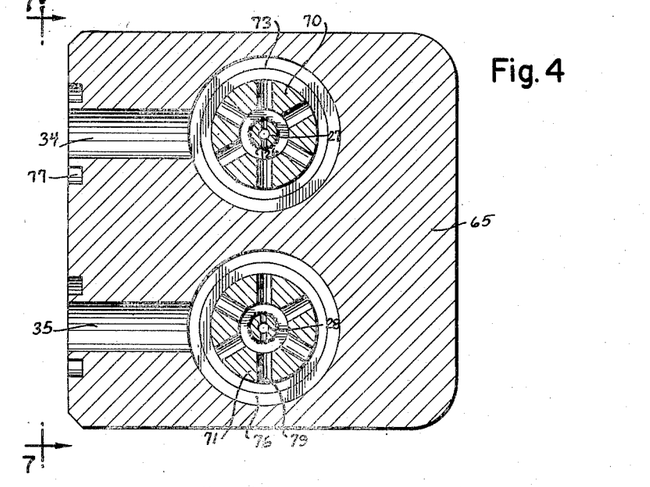
Figure 7:
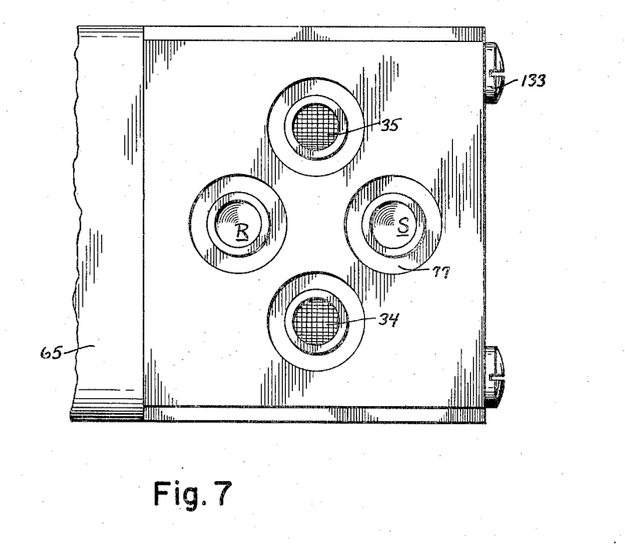
Fig. 7 is a fragmentary side elevational view taken as indicated by line 7—7 of Fig. 4.

A suitable construction incorporating the embodiment of Fig. 11 is illustrated in Figs. 1–3. The unit is encased in a housing 65 of a substantially square cross-section having a comparatively large circular bore 66 opening to the head end of the housing and a pair of smaller bores 67, 68 extending from the floor of the large bore to the foot end of the housing. In these smaller bores are mounted a pair of valve chests 70, 71 centrally bored to receive the shuttle valves 27, 28. It will be noted that the walls of the smaller bores 67, 68 and the outer walls of the valve chests each having three circumferential grooves which mate upon assembly to provide annular chambers 72—77. Four additional grooves are provided in each of the valve chests for carrying O-rings 78 to seal off the chambers 72—77. The chambers 73, 76 communicate by radially extending passages 79 with the bores 25, 26 in the valve chests, and the remaining four chambers communicate via passages 80 with respective of a pair of grooves in the wall of the bores 25, 26. These grooves have been denoted 36, 37 to co-ordinate the schematic and the actual structural embodiment even though the grooves do not connect directly to the discharge and supply passages R and S. As shown by Figs. 1 and 3 the annular chambers 72 and 75 are intersected by a common return passage R and the chambers 74 and 77 are joined to a common supply passage S. Drawing attention to Fig. 4 it will be seen that the remaining two chambers 73, 76 communicate directly with output passages 34, 35. These passages R, S, 34 and 35 have parallel runs and their mouths are exposed at a common side face of the housing as shown in Fig. 7. Each of these mouths is circumscribed by an annular seat 77 for receiving an O-ring so as to make an air-tight connection with a suitable fitting equipped at the ends of piping leading from the passages 34, 35 to the load and from the passages R, S to and from a pressure source.

Seated against the floor of the large bore 66 is an annular base member 80 from which extend two diametrically spaced cantilever posts 81, 82. The upper end portions of these posts are bored to receive the outer ends of aligned nozzle holders 83, 84. These holders are axially bored from their inner ends to provide the nozzle chambers 23, 24 and fitted into the open ends of these chambers are the nozzles 16, 17. The posts are step-bored lengthwise from the nozzle holders and through to the foot of the base member 80 and the resulting stepped passages 30, 31 communicate directly with the bores 25, 26 at their foot end and with the nozzle chamber 23, 24 at their head end via ports 85 and an annular groove 86 in the nozzle holders. Filter units 87 are desirably carried in the nozzle chambers so that fluid entering these chambers must pass through the filter units in order to eject from the nozzles.

The head ends of the posts 81, 82 provide apertured ears 88 which threadably receive the screw links 90, 91 of a turnbuckle whose sleeve is denoted 92. Of importance is the fact that the threads of the screw links are of the same hand but of different pitches. Accordingly, when the sleeve 92 is turned one revolution the posts 81, 82 are bent together or sprung apart a distance equal to the difference between the pitches of the screw links. Thus the gap between the tips of the nozzles 16, 17 can be minutely adjusted. Locknuts 93 are desirably provided at the outer ends of the screw links to hold the adjustments.

Figures 5, 8:
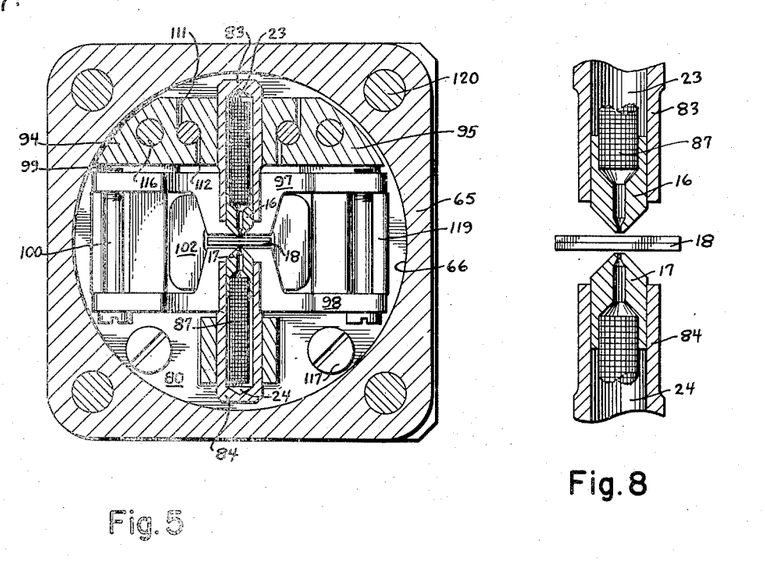
Fig. 8 is a fragmentary view of the nozzle construction looking at the end of the torque armature.
Figure 6:
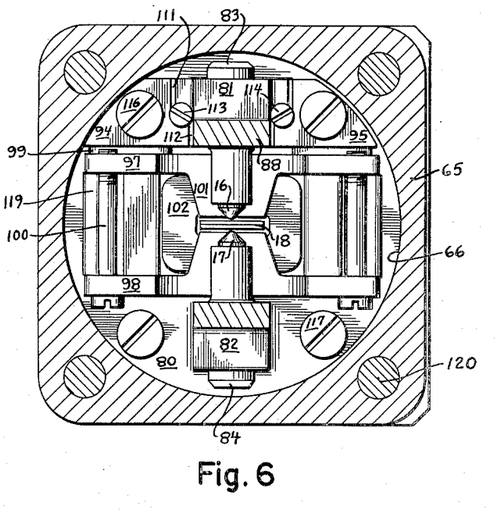

Formed integrally with the base member 80 and extending therefrom at opposite sides of the post 81 are a pair of motor mounts 94, 95. Upon these mounts is secured the torque motor 15 which is held by a pair of screws 96 against spacing plates 99 and in the cavity 40 between the posts 81, 82. This motor has a pair of generally U-shaped pole plates 97, 98 held apart in parallel relation by spacers 119. A pair of screws 100 along with the screws 96 hold the pole plates against the spacers. Each of the pole plates provides a pair of inturned poles each denoted 101 and spaced somewhat from the corresponding pole of the other plate. Positioned in the gaps between the poles and projecting between the nozzles 16, 17 is a flat armature 18 around which are placed a pair of spools 102, 103 for carrying the windings 21, 22. The armature is yieldingly supported by a pair of co-planar torsion plates 20 extending laterally from the armature with their common plane at right angles to the plane of the armature. The outer ends of the torsion plates are each anchored by a screw (not shown) between the two legs of a respective U-shaped bracket 119 projecting inwardly from the pole plate 98. The leads of the windings 21, 22 travel from the spools to an end plate 104 covering the head end of the large bore 66. They are there connected to prongs 105 extending through a tight fitting plug 106 in the cover plate 104. Upon these prongs are fitted mating plugs 107 carried in a cap 108 at the ends of leads 109 from a suitable electrical control unit for controlling the current differential ($i_1$—$i_2$) between the two sets of windings 21, 22. It will be here noted that the insulation of the windings is made impervious to the fluid being used in the system so that the fluid from the nozzles is free to invest the torque motor and discharge through a funnel-like passage 38 provided in the base member and continuing through the housing into communication with the discharge passage R. A fine screen unit 110 is desirably provided in the passage 38. The post 81 is separated from the motor mounts 94, 95 at both sides thereof by pairs of parallel grooves 111, 112 intersecting tapered holes which threadably receive tapered screws 113, 114. It will be noted from Figs. 5 and 6 that the grooves 111, 112 for each tapered hole are tangent to the hole at diametrically opposite points so that as the screws 113, 114 are tightened the post 81 is sprung laterally from the motor mounts and hence is moved with respect to the torque motor. This permits the armature to be accurately centered between the nozzles regardless of the gap therebetween which has been set by use of the turnbuckle adjustment.

The base member and the structure carried thereby are secured in position within the housing by two pairs of cap screws 116, 117. The first pair passes lengthwise through the motor mounts 94, 95 and down through the base member into the housing. The other pair 117 passes directly through the base member at opposite sides of the foot of the pole 82. The cover plate 104 presents an L-shaped out-turned flange 138 extending from its inner face to provide a seat for an O-ring 118 functioning to seal off the head end of the bore 66. Four screws 120 hold the cover plate in position.

Returning to the valves 25, 26, from Fig. 1 it is seen that each can comprise an elongated valve principal 121 having longitudinally spaced sleeves 122, 123 fitted thereon and defining the valve chambers 32, 33. The valve principals extend beyond the sleeves 122 and into the foot-end steps of the passages 30, 31. Seated between the head end of the sleeves 122 and hollow spring retaining washers 124 are the springs 50, 51. The washers seat against shoulders 125 lying between the lower two steps of the passages 30, 31.

Screens 126 of fine mesh are placed in surrounding relation to the portion of the valve principal lying between the sleeves 122, 123 and have their ends seated in grooves between the inner opposed end portions of the sleeves and the outer face of the valve principal. These screens filter the fluid entering the valve chambers 32, 33 from the supply passage S and passing into the through-bores 41, 42 through radially extending passages 129 in the valves. The head ends of the valve through-bores are counter-bored to provide seats for small annular apertured plates 127 producing the orifices 43, 44 and the foot ends are counter-bored to receive vaned members 128. The latter permit fluid to flow between the through-bores and the foot ends of the bores 25, 26 and at the same time serve to receive any endwise thrust being exerted by the pistons 47, 48. These pistons are slidably mounted in chambers 43, 44 provided in plugs 130, 131 fitted into the foot end plate 132. Bolts 133 secure this end plate in position. As best shown in Fig. 2 the plugs 130, 131 have grooves 134, 135 therearound connected by passages 136 to the chambers 43, 44. The groove 134 intersects with a passage 46 which extends toward the chamber 33 and communicates with the foot end of the latter by a short passage 137. Likewise the other groove 135 communicates with the foot end of the opposite bore 25 via passages 45, 139 provided in the end plate 132.

It might be here mentioned that the unit shown in the Fig. 11 schematic will operate very satisfactorily if the pistons 47, 48 are rigidly fixed to the valves 27, 28. To carry out such a modification it is, of course, only necessary to integrate the pistons and the vaned members 128.

Figure 9:
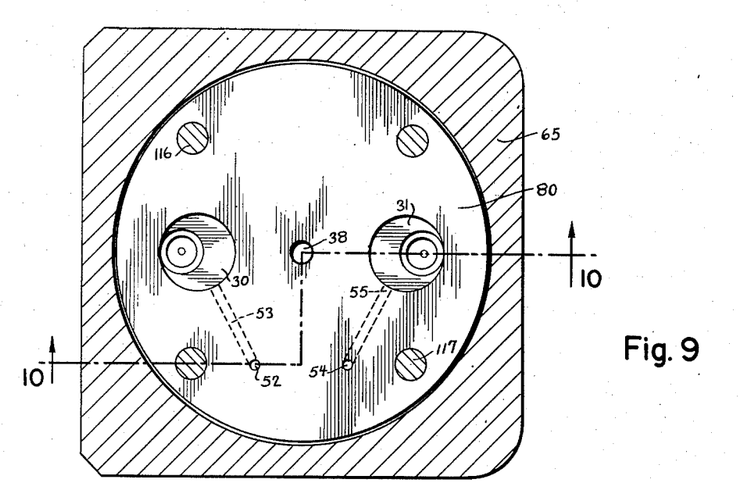
Fig. 9 is a fragmentary horizontal sectional view of a second embodiment of my invention taken along line 9—9 of Fig. 10.
Figure 10:
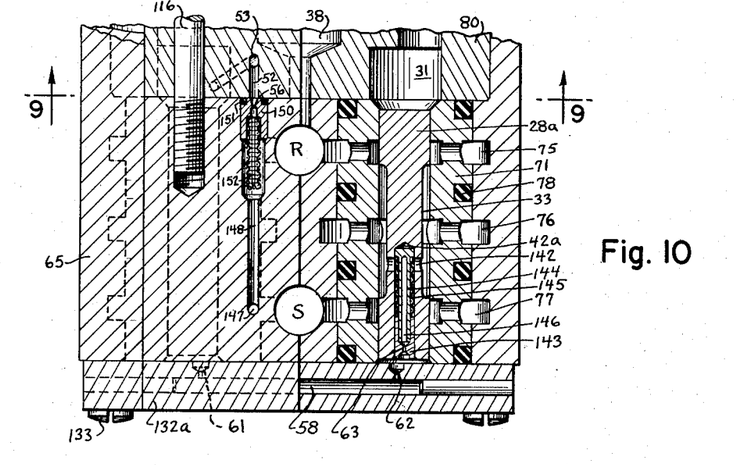
Fig. 10 is a vertical sectional view taken along line 10—10 of Fig. 9.

In Figs. 9 and 10 I have illustrated the structural changes necessary to convert the arrangement of Figs. 1–8 into a unit corresponding to the embodiment shown by the Fig. 13 schematic. The modified valves 27a and 28a are formed with enlarged end portions for selectively covering the grooves 36, 37 and their bores 41a, 42a which are closed at their head ends communicate by radial passages 142 with the valve chambers 32, 33 between the enlarged end portions. The orifices 60 and 63 are provided by plug members 143 having a press fit in the valve bores 41a, 42a. Hollow screen retainers 144 extend from the head end of the valve bores and are seated in the plug members 143. Each of these screen retainers holds a fine screen 145 against the respective plug member and has elongated ports 146 so that fluid can pass from the valve chambers 32, 33 to the foot ends of the bores 41a, 42a, via the passages 142 and the screens 145, through the ports 146 into the screen retainers 144, and out through the orifices 60, 63.

The foot end plate 132 has been changed to provide the orifices 61, 62 and the cross-connecting passage 58, this altered end plate being denoted 132a. As shown in Fig. 10 the passage 58 is formed by a cross-bore plugged at the ends and this closed passage is interconnected with the foot ends of the bores 25, 26 by small funnel-shaped restricted passages functioning as the orifices 61, 62.

In order to conduct fluid from the supply passage S to the nozzles 16, 17 the housing is further machined, as best shown in the left side of Fig. 10, with short passages 147 positioned at opposite sides of the supply passage S and communicating by one of their ends with the annular chambers 74, 77. The other ends of these passages 147 connect with the smaller diametered steps of longitudinally extending stepped-bores 148 opening to the foot end of the large bore 66. Plug members 150 are fitted into the mouths of the stepped-bores and provide the orifices 56, 57. Each of the plug members provides an annular external seat at its head end for an O-ring 151 and an internal seat for a filter unit 152 at its foot end. Continuing headwise from the orifices 56, 57 are passages 52, 54 formed in the base member 80. In this regard it will be noted that in the Fig. 13 schematic the passage designated by the numerals 52, 54 includes the passages 147 and 148 in the actual structure. The head ends of the passage 52, 54 communicate by sloping passages 53, 55 with the bores 30, 31. The O-rings 151 prevent leakage from the passages 52, 54 to the passage 38.

From the above explanations it is believed to be unnecessary to discuss in detail the structural modifications necessary to carry out the Fig. 12 embodiment, it sufficing to say that a substitution of end plate 132a for the plate 132 and the replacing of the vaned members 128 by orifice-producing annular plates such as the plates 127 is all that is required.

It is thought that the invention and its advantages will have been clearly understood from the foregoing detailed description of the now preferred illustrated embodiments. Minor changes in the details of construction can self-evidently be resorted to without departing from the spirit of the invention and it is therefore my intention that no limitations be implied and that the hereto annexed claims be given the broadest interpretation to which the employed language fairly admits.

What I claim is:

1. In a pressure control system, a housing providing a pair of bores each having a supply port toward the foot end of its side wall and a discharge port toward the head end of such wall, a pair of shuttle valves slidably mounted in the bores, each of said valves having enlarged end portions adapted to close a respective one of the ports, passages each arranged to transfer fluid from between the enlarged ends of a respective said valve to or from the foot end portion of the related bore beneath such valve, a passage interconnecting said foot end portions of the bores, a respective orifice in each of all of the aforesaid passages, a common supply of a high pressure fluid to the supply ports, means for interconnecting the discharge ports with a low pressure sump, pressure means acting on the head ends of the valve and including supplies of fluid under pressure to the head end portions of the bores above the valves, and control means for varying the fluid pressure in said head end portions in an inverse relation one to the other.

2. In a pressure control system, a housing providing a pair of bores each having a supply port toward the foot end of its side wall and a discharge port toward the head end of such wall, a pair of shuttle valves slidably mounted in the bores, each of said valves having enlarged end portions adapted to close a respective one of the ports, passages each arranged to transfer fluid from between the enlarged ends of a respective said valve to or from the foot-end portion of the related bore beneath such valve, passages each arranged to transfer fluid from between the enlarged ends of a respective said valve to or from the head-end portion of the related bore above such valve, a passage interconnecting the said foot-end portions of the bores, a respective orifice in each of all of the aforesaid passages, spring means urging the valves toward their foot ends, a common supply of a high pressure fluid to the supply ports, means for interconnecting the discharge ports with a low pressure sump, and control means for varying the fluid pressures in said head-end portions of the bores in an inverse relation one to the other.

3. In a pressure control system, a housing providing a pair of bores each having a supply port toward the foot end of its side wall and a discharge port toward the head end of such wall, a pair of shuttle valves slidably mounted in the bores, each of said valves having enlarged end portions adapted to close a respective one of the ports, a common supply of a high pressure fluid to the supply ports, means for interconnecting the discharge ports with a low pressure sump, passages each arranged to transfer fluid from the said common supply to the head-end portion of a respective said bore above the latter's related valve, passages each arranged to transfer fluid from between the enlarged ends of a respective said valve to or from the foot-end portion of the related bore beneath such valve, a passage interconnecting said foot-end portions of the bores, a respective orifice in each of all of the aforesaid passages, and control means for varying the fluid pressures in said head-end portions of the bores in an inverse relation one to the other.

4. In a pressure control system, a housing providing a pair of bores each having a supply port toward the foot end of its side wall, a discharge port toward the head end of such wall, and a load port, a pair of shuttle valves slidably mounted in the bores for varying the communication of said load ports with said supply and discharge ports to selectively control the fluid pressures at the load ports, passages each arranged to communicate a respective load port with the foot end portion of the related bore, a passage interconnecting said foot end portions of the bores, a respective orifice in all of the aforesaid passages, pressure means acting on the head ends of the valve and including supplies of fluid under pressure to the head end portions of the bores above the valves, and control means for varying the fluid pressure in head end portions in an inverse relation one to the other.

5. In a pressure control system, a valve housing providing a pair of bores each having supply and discharge ports and a load port for the passage of fluid under pressure, a source of fluid under a supply pressure to said supply ports, a pair of valves movably mounted in said bores for varying the communication of said supply and discharge ports with said load ports to selectively control the fluid pressures at the load ports, a supply orifice for each bore communicating with said source, input means for each valve including control fluid derived from said source via a respective said supply orifice and having a back pressure normally stepped down from said supply pressure for urging the corresponding valve in one direction of travel, and feedback pressure means for each valve including feedback fluid communicating with the respective load port and under a respective feedback pressure for opposing the force exerted on the valve by the respective said control means, and including orifice means normally stepping down said feedback pressures from the pressures at the related load ports whereby said valves will be balanced when said pressures at the load ports are amplified with respect to the corresponding control pressures, and means for varying the back pressures of said control fluids in an inverse relation one to the other.

6. In a pressure control system, a housing providing a pair of bores each having a supply port toward the foot end of its side wall and a discharge port toward the head end of such wall, a pair of valves movably mounted in the bores for selectively closing said ports, passages each arranged to transfer fluid from between the ports of a respective said bore to or from the foot end portion of the related bore beneath the respective valve, a passage interconnecting said foot end portions of the bores, a respective orifice in all of the aforesaid passages, pressure means acting on the head ends of the valve and including supplies of fluid under pressure to the head end portions of the bores above the valves, and control means for varying the fluid pressure in said head end portions in an inverse relation one to the other.

References Cited in the file of this patent

UNITED STATES PATENTS

| | | |
|---|---|---|
| 957,511 | Lockwood | May 10, 1910 |
| 1,966,841 | Zelov | July 17, 1934 |
| 2,020,847 | Mitereff | Nov. 12, 1935 |
| 2,053,797 | King | Sept. 8, 1936 |
| 2,064,379 | Kundig | Dec. 15, 1936 |
| 2,080,212 | Otto | May 11, 1937 |
| 2,137,954 | Sanford et al. | Nov. 22, 1938 |
| 2,159,819 | Snediker | May 23, 1939 |
| 2,288,912 | Mears | July 7, 1942 |
| 2,352,344 | Rockwell | June 27, 1944 |
| 2,399,843 | Adams | May 7, 1946 |
| 2,400,126 | Matthews | May 14, 1946 |
| 2,477,897 | Ray | Aug. 2, 1949 |
| 2,584,455 | Hughes | Feb. 5, 1952 |
| 2,601,207 | Jacques | June 17, 1952 |
| 2,601,867 | Alyea | July 11, 1952 |
| 2,625,136 | Moog | Jan. 13, 1953 |

FOREIGN PATENTS

| | | |
|---|---|---|
| 604,798 | Germany | Oct. 30, 1934 |
| 515,617 | Great Britain | Dec. 11, 1939 |
| 246,086 | Switzerland | Sept. 1, 1947 |